(12) United States Patent
Ripy et al.

(10) Patent No.: US 7,003,609 B2
(45) Date of Patent: *Feb. 21, 2006

(54) METHOD AND APPARATUS OF ALLOCATING MINIMUM AND MAXIMUM BANDWIDTHS ON A BUS-BASED COMMUNICATION SYSTEM WITH REDUNDANT COMMUNICATION CIRCUITS

(75) Inventors: Paul B. Ripy, Guerneville, CA (US); Keith Q. Chung, Durham, NC (US); Gary J. Geerdes, Santa Rosa, CA (US); Christophe P. Leroy, Rohnert Park, CA (US)

(73) Assignee: Tellabs Petaluma, Inc., Petaluma, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/669,193

(22) Filed: Sep. 23, 2003

(65) Prior Publication Data

US 2005/0066092 A1  Mar. 24, 2005

(51) Int. Cl.
*G06F 13/00*  (2006.01)

(52) U.S. Cl. ...................... 710/113; 710/107; 710/240; 710/244

(58) Field of Classification Search ................ 710/107, 710/111, 113, 117, 240, 244; 714/43; 370/225, 370/228
See application file for complete search history.

(56) References Cited

U.S. PATENT DOCUMENTS

| | | | |
|---|---|---|---|
| 5,867,670 A | * | 2/1999 | Kim et al. .................. 710/113 |
| 6,035,361 A | * | 3/2000 | Kim et al. .................. 710/113 |
| 6,512,769 B1 | * | 1/2003 | Chui et al. .................. 370/232 |
| 6,636,915 B1 | * | 10/2003 | Dabby et al. ............... 710/240 |
| 6,768,745 B1 | * | 7/2004 | Gorshe et al. .............. 370/421 |
| 2004/0081145 A1 | * | 4/2004 | Harrekilde-Petersen et al. .......................... 370/362 |

* cited by examiner

*Primary Examiner*—Glenn A. Auve
(74) *Attorney, Agent, or Firm*—Mark C. Pickering (57) ABSTRACT

Access to a bus is granted to one of a number of requesting communication circuits that each submitted a bus control request during a request period of an arbitration period in response to grant information which can be stored in a primary and a backup priority table. If a requesting communication circuit has an identity and priority that match the identity and priority of a communication circuit stored in a row of the primary or backup priority table that corresponds with the arbitration period, and the identities stored in the tables match only one requesting communication circuit, access to the bus is granted to the requesting communication circuit.

18 Claims, 7 Drawing Sheets

METHOD AND APPARATUS OF ALLOCATING MINIMUM AND MAXIMUM BANDWIDTHS ON A BUS-BASED COMMUNICATION SYSTEM WITH REDUNDANT COMMUNICATION CIRCUITS

RELATED APPLICATION

The present application is related to application Ser. No. 10/669,192 for Method and Apparatus of Allocating Minimum and Maximum Bandwidths on a Bus-Based Communication System by Paul B. Ripy et al. filed on an even date herewith.

BACKGROUND OF THE INVENTION

1. Field of the Invention

The present invention relates to a method and apparatus of allocating bandwidth on a bus-based communication system and, more particularly, to a method and apparatus of allocating minimum and maximum bandwidths on a bus-based communication system with redundant communication circuits.

2. Description of the Related Art

A bus-based communication system is a system that allows a number of communication circuits to exchange signals with each other over a group of shared electrical pathways. For example, the communication circuits on service cards, such as xDSL and other line cards, can be connected to, and communicate over, a bus.

Figure 1:
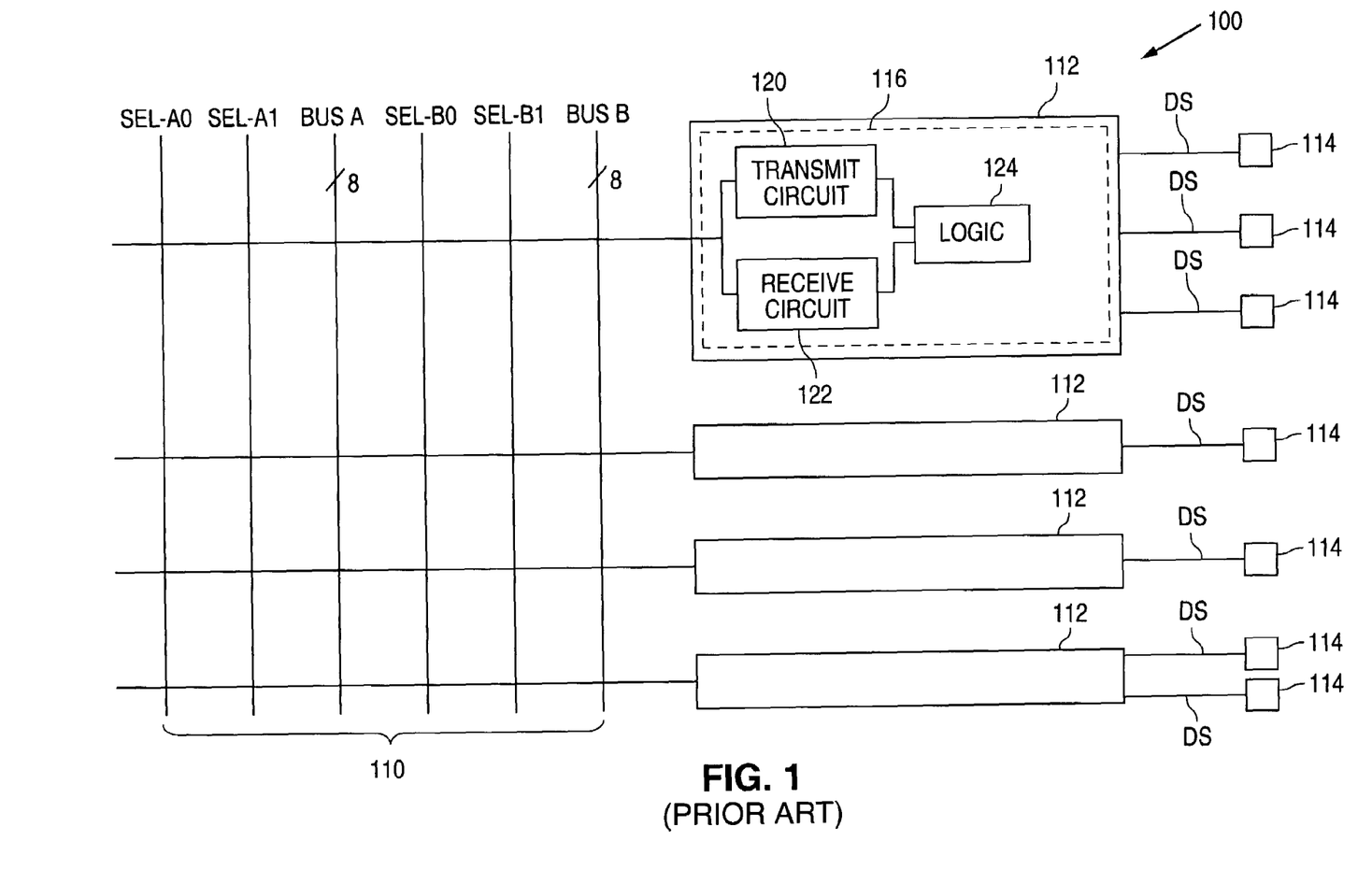
FIG. 1 is a block diagram illustrating a conventional bus-based communications system 100.

FIG. 1 shows a block diagram that illustrates a conventional bus-based communications system 100. As shown in FIG. 1, system 100 includes a cell bus 110 that has a first bus BUS-A and a pair of first-bus control lines SEL-A0 and SEL-A1. In addition, cell bus 110 also includes a second bus BUS-B, and a pair of second-bus control lines SEL-B0 and SEL-B1. First bus BUS-A utilizes a first group of electrical pathways, such as eight electrical pathways that represent eight bits, while second bus BUS-B utilizes a second group of electrical pathways, such as eight electrical pathways that represent eight bits.

As further shown in the FIG. 1 example, system 100 also includes a number of service cards 112 that are connected to cell bus 110. Each service card 112 is also connected to a number of network devices 114 to receive a number of streams of data cells DS. The data cells DS can have different priority levels such that a data cell DS from one network device 114 is preferred over the data cell DS from another network device 114.

Each service card 112 includes a communication circuit 116 that has a transmit circuit 120 that transmits data cells onto cell bus 110, and a receive circuit 122 that receives data cells from cell bus 110. Communication circuit 116 also includes a logic block 124 that processes the data cells DS.

In operation, when a number of communication circuits 116 are connected to cell bus 110, one of the communication circuits 116 assumes the role of bus master, while the remaining communication circuits 116 assume the roles of bus slaves and communicate over the bus as allowed by the bus master.

The bus master controls the timing of the bus along with access to the bus. For example, the bus master can define transmission periods on bus BUS-A and bus BUS-B, and determine the communication circuit 116 that has permission to use each of the transmission periods on the buses.

Figure 2:
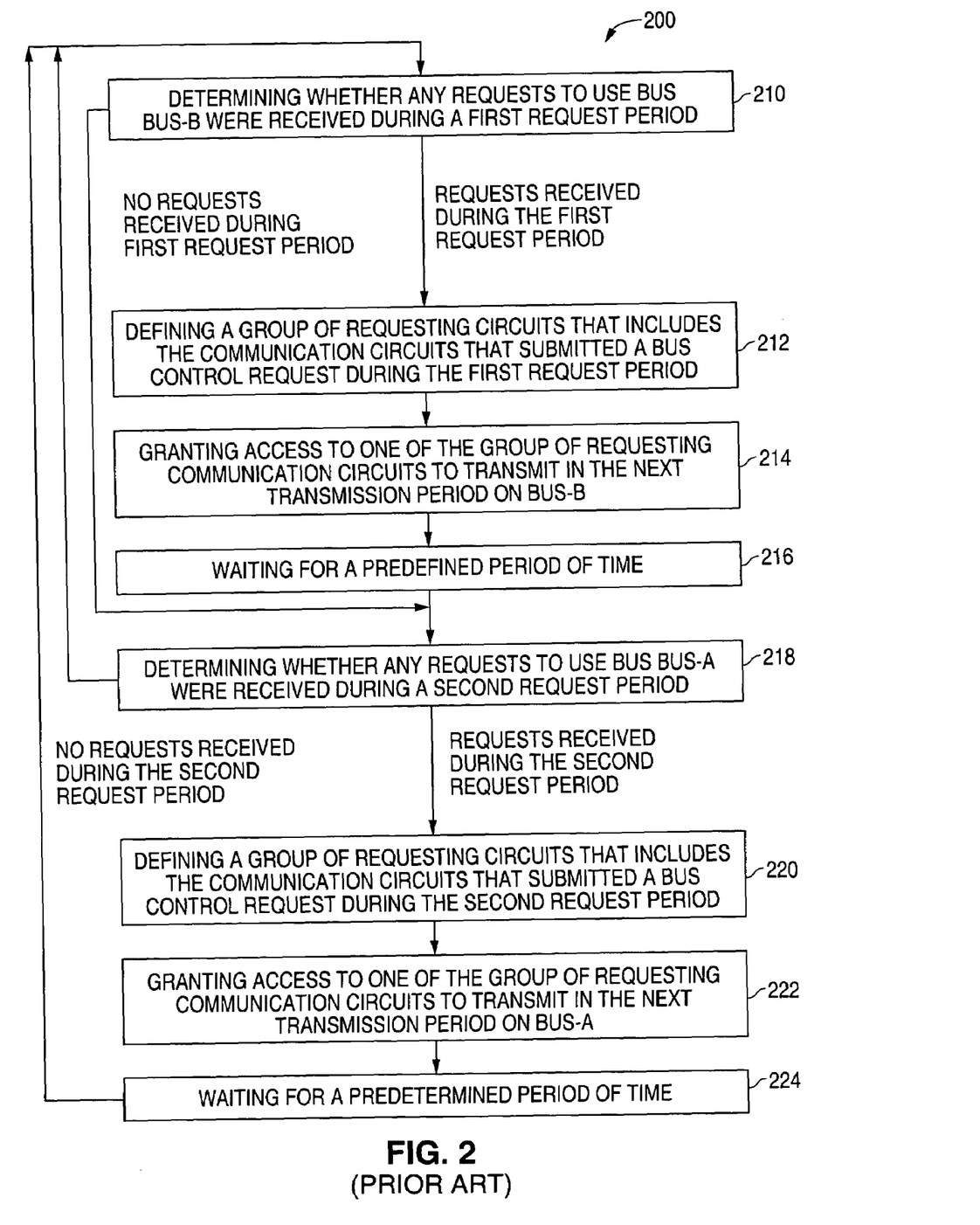
FIG. 2 is a state diagram illustrating a prior art state machine 200 operating a bus master.

FIG. 2 shows a state diagram that illustrates a prior art state machine 200 operating as a bus master. State machine 200 is executed by the logic block 124 of the communication circuit 116 that is the bus master. As shown in FIG. 2, state machine 200 begins at state 210 by determining whether any requests to use bus BUS-B were received during a first request period.

Requests to use bus BUS-B are received during request periods where each communication circuit 116 that wishes to transmit a data cell over bus 110 outputs a request. The requests are output over select lines SEL-A0, SEL-A1, SEL-B0, and SEL-B1 to the bus master. Each request period can be, for example, 12 clock cycles long to support 24 communication circuits 116.

For example, a $1^{st}$ communication circuit can request bus BUS-B during a first-request clock cycle of a request period on select line SEL-A0 and SEL-A1, while a 13th communication circuit can request bus BUS-B during the first-request clock cycle on select lines SEL-B0 and SEL-B1. In addition, a $2^{nd}$ communication circuit can request bus BUS-B during a second-request clock cycle on select line SEL-A0 and SEL-A1, while a 14th communication circuit can request bus BUS-B during the second-request clock cycle on select lines SEL-B0 and SEL-B1. Thus, in this example, after 12 clock cycles, each of 24 communications circuits has had a one clock cycle opportunity to request control of bus BUS-B over select lines SEL-A0, SEL-A1, SEL-B0, and SEL-B1.

Each communication circuit 116 outputs a logic value onto the select lines SEL during its assigned clock cycle to indicate whether a request is being made and, if so, the priority level of the request. For example, a logic value of 0-0 can represent a high priority level, while a logic value of 0-1 can represent a medium priority level. In addition, a logic value of 1-0 can represent a low priority level, while a logic value of 1-1 can represent no request.

When requests are received during the first request period, state machine 200 moves to state 212 to define a group of requesting circuits that include the communication circuits 116 that submitted a bus control request during the first request period. For example, state machine 200 can define a group that includes only the communication circuits 116 that requested control of bus BUS-B during the first request period.

Following this, state machine 200 moves to state 214 to grant access to one of the group of requesting communication circuits to transmit in the next transmission period on bus BUS-B. Access is granted by outputting a grant to the requesting communication circuit 116 over the control lines SEL-B0 and SEL-B1. States 212 and 214 can be, for example, eight clock periods long. In addition, an error correction code can be transmitted at the same time on the select lines SEL-A0 and SEL-A1 that are not carrying the grant. Once the grant has been output, state machine 200 moves to state 216 to wait for a predefined period of time. The total time required to complete states 210–216 can be, for example, 26 clock cycles.

After the predefined time has expired, state machine 200 moves to state 218 to determine whether any requests to use bus BUS-A were received during a second request period. In the present example, one clock cycle before state machine 200 moves to state 218, the communication circuit 116 that received control over bus BUS-B, begins transmitting a data cell on bus BUS-B.

As with bus BUS-B, requests to use bus BUS-A are also received during a request period where each communication circuit 116 that wishes to transmit a data cell over bus 110 can output a request. The requests are again output over select lines SEL-A0, SEL-A1, SEL-B0, and SEL-B1 to the bus master, and the request period can also be 12 clock cycles long to support 24 communication circuits 116.

For example, a $1^{st}$ communication circuit can request bus BUS-A during a first-request clock cycle of a next request period on select lines SEL-B0 and SEL-B1, while a 13th communication circuit can request bus BUS-A during the first-request clock cycle on select lines SEL-A0 and SEL-A1. In addition, a $2^{nd}$ communication circuit can request bus BUS-A during the second-request clock cycle on select lines SEL-B0 and SEL-B1, while a 14th communication circuit can request bus BUS-A during the second-request clock cycle on select lines SEL-A0 and SEL-A1. Thus, in this example, 12 clock cycles after the request period for bus BUS-A began, each of 24 communications circuits has had a one clock cycle opportunity to request control of bus BUS-A over select lines SEL-A0, SEL-A1, SEL-B0, and SEL-B1.

When requests for bus BUS-A are received during the second request period, state machine 200 moves to state 220 to define a group of requesting circuits that include the communication circuits 116 that submitted a bus control request during the second request period. For example, state machine 200 can define a group that includes only the communication circuits 116 that requested control of bus BUS-A during the second request period.

Following this, state machine 200 moves to state 222 to grant access to one of the group of requesting communication circuits to transmit a data cell in the next transmission period on bus BUS-A. Access is granted by outputting a grant to the requesting communication circuit 116 over the control lines SEL-A0 and SEL-A1. States 220 and 222 can be, for example, eight clock periods long. In addition, an error correction code can be transmitted at the same time on the select lines SEL-B0 and SEL-B1 that are not carrying the grant.

Once the grant has been output, state machine 200 moves to state 224 to wait for a predefined period of time. The total time required to complete states 218–224 can be, for example, 26 clock cycles. After the predefined time has expired, state machine 200 returns to state 210 to repeat the process. In addition, if no requests are received during the first request period, state machine 200 waits until the end of the 26 clock cycle, and then moves from state 210 to state 218. Similarly, if no requests are received during the second request period, state machine 200 waits until the end of the 26 clock cycle, and then moves from state 218 to state 210.

Thus, state machine 200 moves through states 210–216, which define a first arbitration period, to determine and grant permission to transmit a data cell during the next transmission period on bus BUS-B, and then through states 218–224, which define a second arbitration period, to determine and grant permission to transmit a data cell during the next transmission period on bus BUS-A. As a result, state machine 200 provides an alternating series of arbitration periods where control over bus BUS-B is determined, and then control over bus BUS-A is determined.

Figure 3:
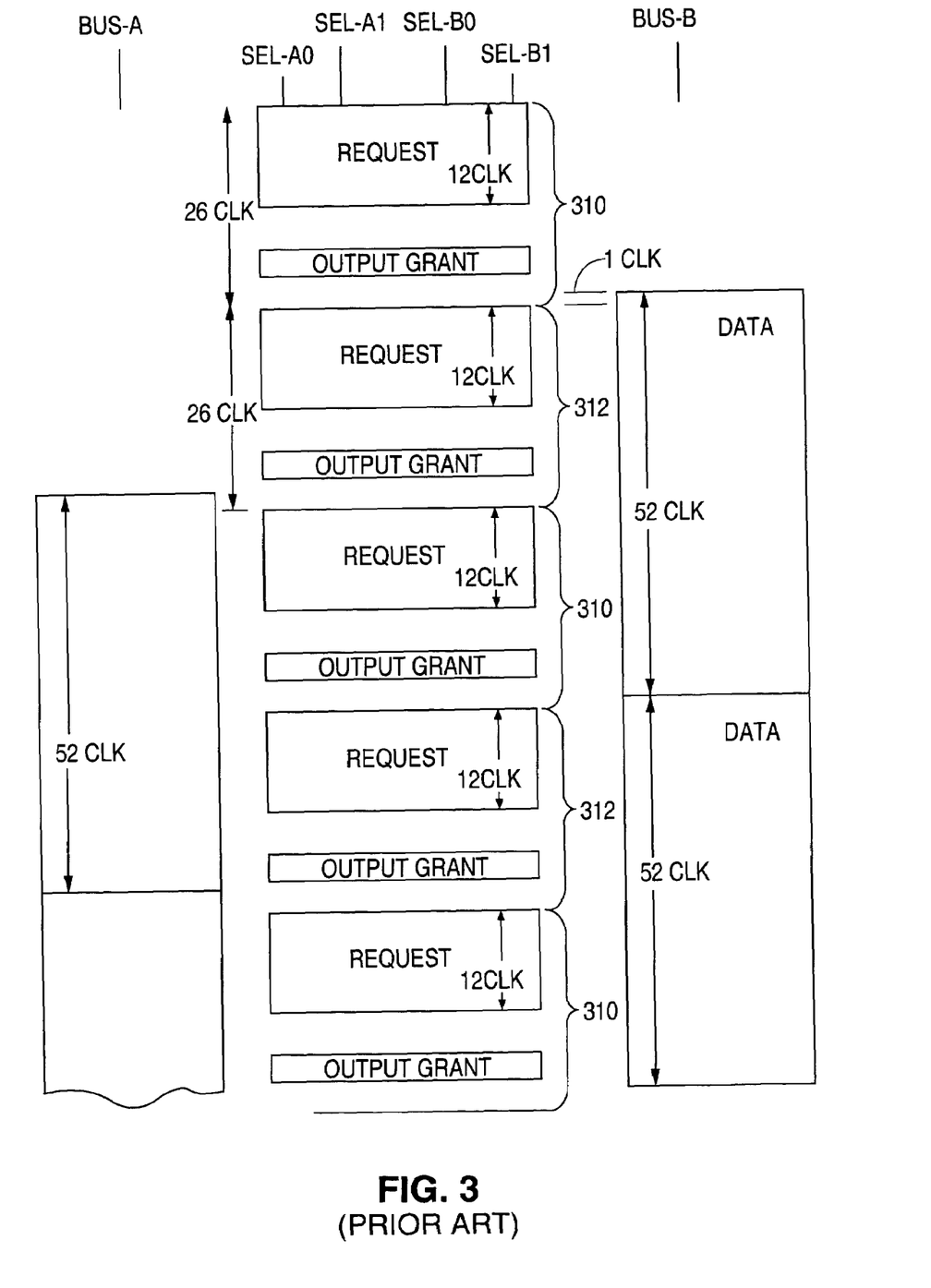
FIG. 3 is a graphical representation further illustrating prior art state machine 200.

FIG. 3 shows a graphical representation that further illustrates prior art state machine 200. As shown in FIG. 3, state machine 200 defines an alternating series of BUS-B and BUS-A arbitration periods 310 and 312, respectively, on control lines SEL-A0, SEL-A1, SEL-B0, and SEL-B1. The BUS-B arbitration period 310 can be implemented with, for example, states 210–216, while the BUS-A arbitration period 312 can be implemented with, for example, states 218–224.

In the FIG. 3 example, following a BUS-B arbitration period 310, the communication circuit 116 that received the grant begins transmitting a data cell on bus BUS-B one clock cycle before the next BUS-A arbitration period 312, and continues transmitting the data cell for a transmit period. The transmit period can be, for example, 52 clock cycles long.

Similarly, following a BUS-A arbitration period 312, the communication circuit 116 that received the grant begins transmitting a data cell on bus BUS-A one clock cycle before the next BUS-B arbitration period 310, and continues transmitting the data cell for the transmit period.

Thus, as shown in FIG. 3, when a communication circuit 116 receives control over one of the two buses, such as BUS-A, the circuit 116 transmits the data cell over the bus during the next two arbitration periods. By utilizing two 26-cycle arbitration periods and one 52-cycle transmit period, a single 52 byte ATM cell can be transmitted.

Figure 4:
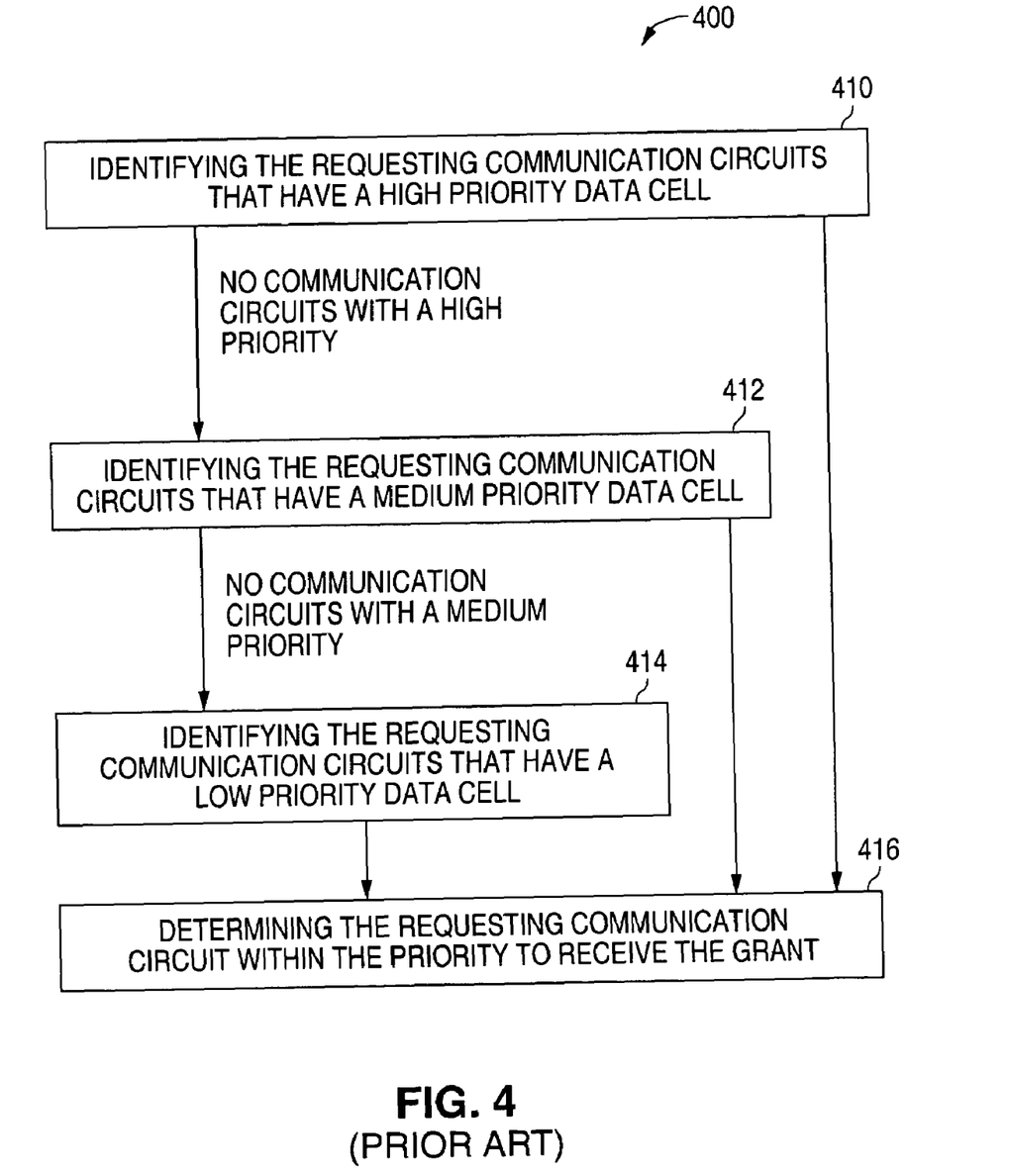
FIG. 4 is a flow chart illustrating a prior art method 400 of granting access to a bus to one of a number of requesting communication circuits.

FIG. 4 shows a flow chart that illustrates a prior art method 400 of granting access to a bus to one of a number of requesting communication circuits. In the present case, each of the requesting communication circuits submitted a bus control request to the bus master during the same request period.

As shown in FIG. 4, method 400, which can be used to implement steps 214 and 222, begins at step 410 by identifying the requesting communication circuits 116 that wish to transmit a high priority data cell. Priority can be divided into different levels, such as high, medium, and low, and assigned to different data cells DS so that a data cell DS with a high priority is preferred over a data cell DS with a medium or low priority, while a data cell DS with a medium priority is preferred over a data cell DS with a low priority.

If no communication circuits with a high priority data cell requested control, method 400 moves to step 412 to identify the requesting communication circuits 116 that wish to transmit a medium priority data cell. If no communication circuits with a medium priority data cell requested control, method 400 moves to step 414 to identify the requesting communication circuits that wish to transmit a low priority data cell.

Once the requesting communication circuits within a priority level have been identified, method 400 moves from either step 410, step 412, or step 414 to step 416 to determine which of the communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. In a declining round robin, the requesting communication circuits 116 circulate within a hierarchical ranking.

The requesting communication circuit at the top of the ranking is assigned the grant and, after receiving the grant, moves to the bottom of the ranking. The ranking of a communication circuit 116 increases each time the circuit is denied a grant, i.e., control of the bus.

One drawback with method 400 is that if the requesting communication circuits 116 with high priority data streams are over subscribed, method 400 can always or nearly always move from step 410 to step 416. As a result, the higher priority data cells DS can consume all of the available bandwidth, thereby preventing the lower priority data cells DS from being transmitted onto the bus. Thus, there is a need for a method and apparatus that grants access to a bus that insures that lower priority data streams are able to transmit information across the bus.

SUMMARY OF THE INVENTION

A method of granting access to a bus to one of a plurality of requesting communication circuits that each submitted a bus control request during a request period of an arbitration period is disclosed. The method includes determining a first and a second stored identity associated with the arbitration period. The first stored identity identifies a first communication circuit, while the second stored identity identifies a second communication circuit. In addition, the method includes determining whether any requesting communication circuit has an identity that matches the first or the second stored identity.

A communication circuit is disclosed in accordance with an embodiment of the present invention. The communication circuit includes a transmit circuit to transmit information onto a cell bus, and a receive circuit to receive information from the cell bus. The communication circuit also includes a memory to store grant information regarding a plurality of arbitration periods. The grant information for each arbitration period includes a first stored identity that identifies a first communication circuit, and a second stored identity that identifies a second communication circuit.

The communication circuit further includes a logic circuit connected to the transmit circuit, the receive circuit, and the memory. The logic circuit to determine whether any communication circuits requested control of a bus during an arbitration period. In addition, the logic circuit to determine a first and a second stored identity associated with the arbitration period, and whether any requesting communication circuit has an identity that matches the first or the second stored identity.

A better understanding of the features and advantages of the present invention will be obtained by reference to the following detailed description and accompanying drawings that set forth an illustrative embodiment in which the principles of the invention are utilized.

DETAILED DESCRIPTION OF THE INVENTION

Figure 5:
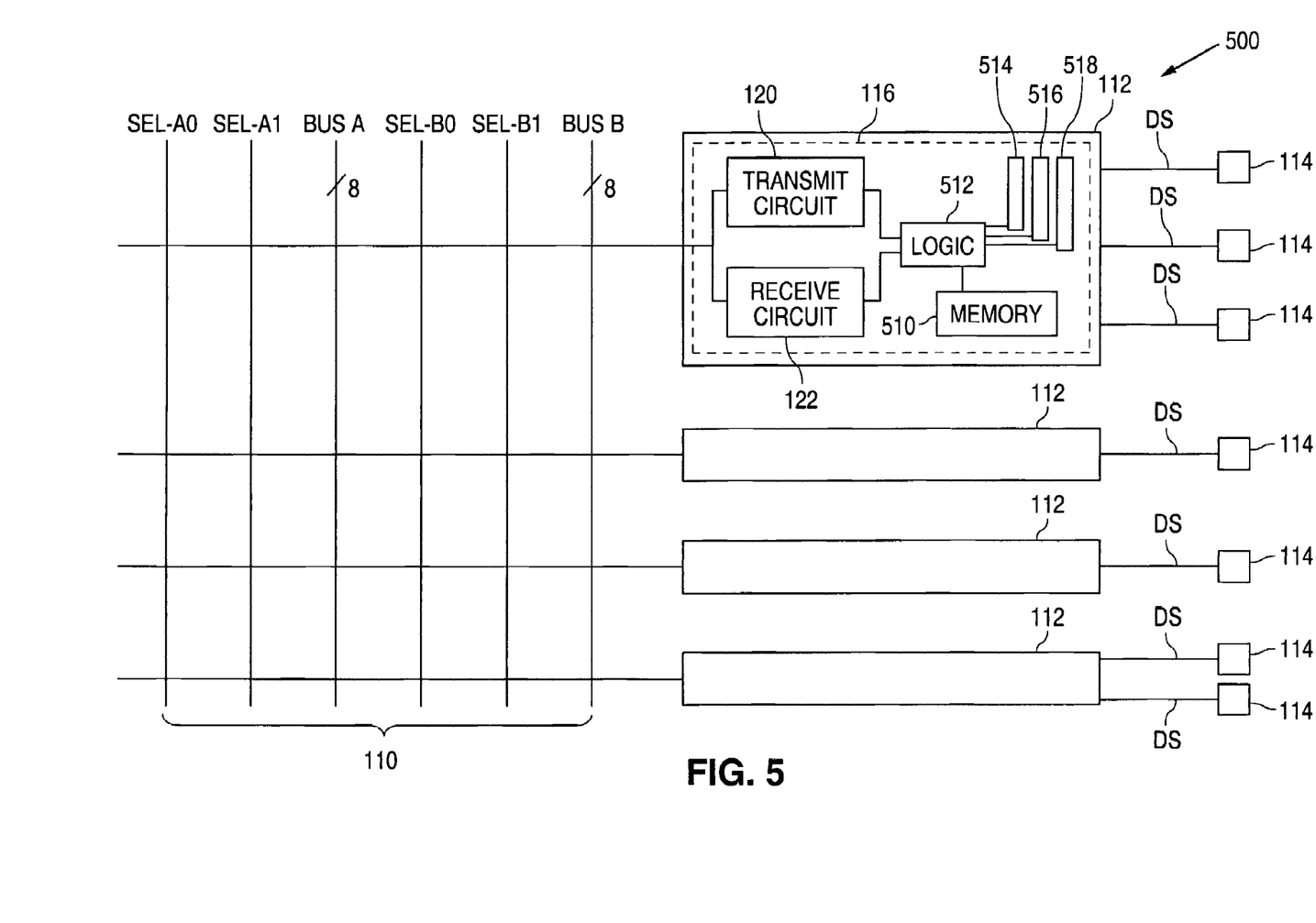
FIG. 5 is a block diagram illustrating an example of a bus-based communications system 500 in accordance with the present invention.

FIG. 5 shows a block diagram that illustrates an example of a bus-based communications system 500 in accordance with the present invention. System 500 is similar to system 100 and, therefore, utilizes the same reference numerals to designate the structures which are common to both systems.

As shown in FIG. 5, system 500 differs from system 100 in that system 500 includes a memory 510 that stores grant information that is associated with each of a number of arbitration periods. The grant information, which can be organized as a Primary Priority Table and a Backup Priority Table, can be stored in a number of memory devices, including registers and non-volatile memory cells.

An example of a Primary Priority Table and a Backup Priority Table are shown below. The Primary and Backup Priority Tables have a corresponding number of rows where each row corresponds with an arbitration period. (As described above, an arbitration period can be a 26 clock cycle period where requests are received during a request period and a grant is output.) Thus, a Priority Table that is 512 rows long represents 512 consecutive arbitration periods.

| | Primary Priority Table | | |
|---|---|---|---|
| Arbitration Period | Valid Status | Stored Priority | Stored Identity |
| 1 | 1 | 11 | 00001 |
| 2 | 1/0 | XX | XXXXX |
| 3 | 1/0 | XX | XXXXX |
| . | . | . | . |
| . | . | . | . |
| 512 | 1/0 | XX | XXXXX |

In addition, each row of the Primary Priority Table includes a valid status, a stored identity, and a stored priority. The valid status indicates whether the row of data associated with the arbitration period is valid. The stored identity identifies a communication circuit 116, while the stored priority indicates a priority level of a data cell to be transmitted by the communication circuit.

For example, each row of data can include five bits [bits 4:0] of stored identity that identify a communication circuit 116, two bits [bits 6:5] of stored priority that identify one of four priority levels, and one bit [bit 7] of valid status that indicates whether the data in the row associated with the arbitration period is valid.

The four priority levels include a high priority level represented by, for example, a 0-0, and a medium priority level represented by, for example, a 0-1. In addition, the four priority levels also include a low priority level represented by, for example, a 1-0, and an all priority level represented by, for example, a 1-1.

Each row of the Backup Priory Table, however, includes a valid entry only if a communication circuit in the Primary Priority Table is backed up. For example, assume that a first communication circuit is on a CPU line card, second through fifth communication circuits are on xDSL line cards, and a sixth communication circuit is on a backup CPU line card.

In this example, the first through the fifth communication circuits are identified in one or more rows of the Primary Priority Table, while the sixth communication circuit is not listed in the Primary Priority Table. The sixth communication circuit, the backup circuit, is identified in one or more rows of the Backup Priority Table, but only in rows that correspond with the rows that identify the first communication circuit.

For example, if the first communication circuit is identified in the first, fourth, and fifth rows of the Primary Priority Table, the sixth communication circuit is identified in the first, fourth, and fifth rows of the Backup Priority Table. The remaining rows of the Backup Priority Table can be filled with invalid entries, such as a stored identity, a stored priority, and a valid status of a communication circuit that does not exist on bus 110. Both the Primary Priority Table and the Backup Priority Table are set up on power up or after a system reset.

| Backup Priority Table | | | |
|---|---|---|---|
| Arbitration Period | Valid Status | Stored Priority | Stored Identity |
| 1 | 1 | 11 | 00010 |
| 2 | | | |
| 3 | | | |
| . | . | . | . |
| . | . | . | . |
| . | . | . | . |
| 512 | | | |

As further shown in FIG. 5, system 500 also differs from system 100 in that system 500 includes a logic circuit 512 and a high priority register 514 that indicates whether the high priority data received by a communication circuit 116 is arbitration, such as round robin, enabled. System 500 also includes a medium priority register 516 that indicates whether the medium priority data received by the communication circuit 116 is arbitration enabled, and a low priority register 518 that indicates whether the low priority data received by the communication circuit 116 is arbitration enabled.

Figure 6A:
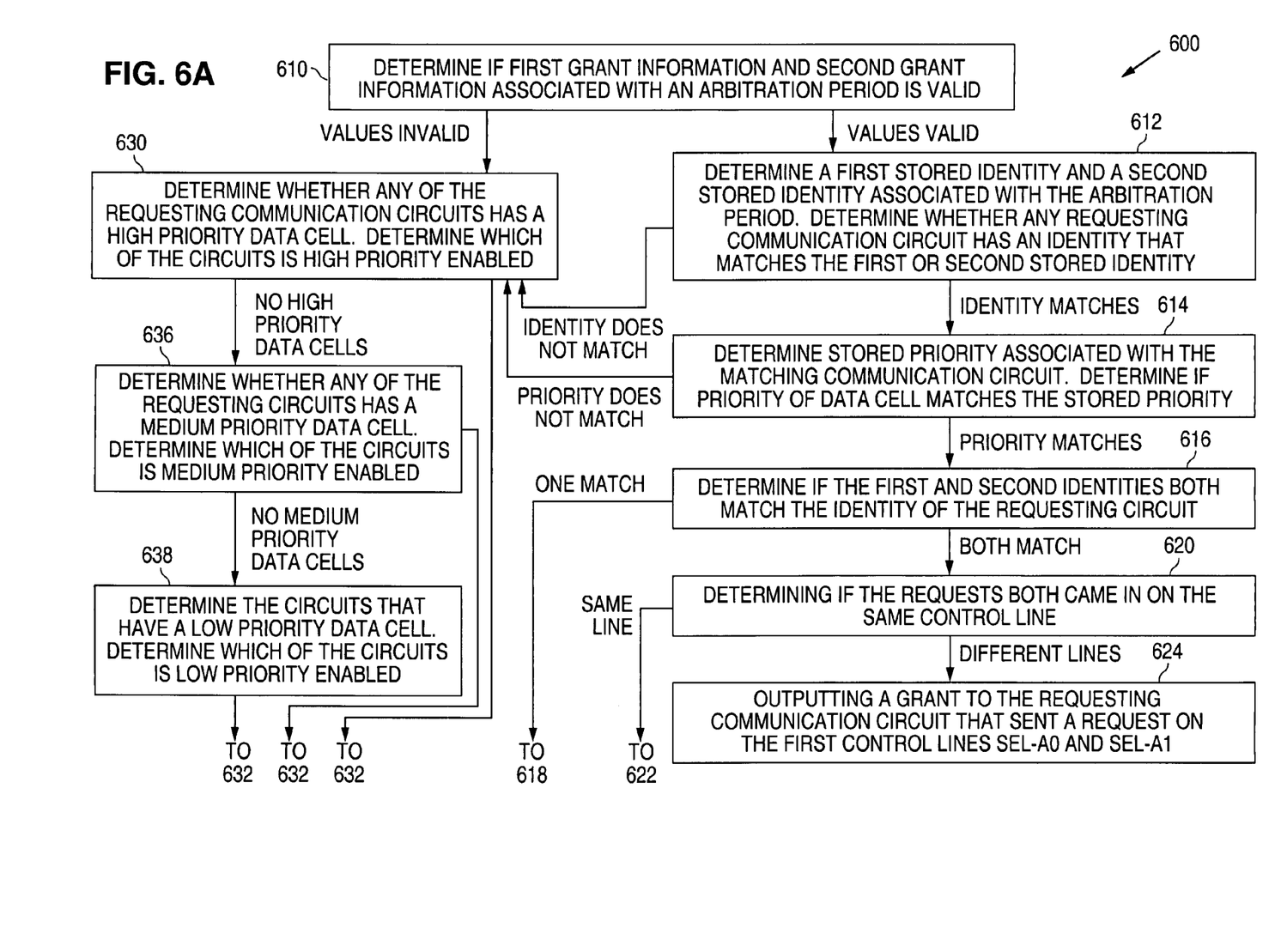
FIGS. 6A–6B are a state diagram illustrating an example of a state machine 600 that grants access to a bus to one of a number of requesting communication circuits in accordance with the present invention.
Figure 6B:
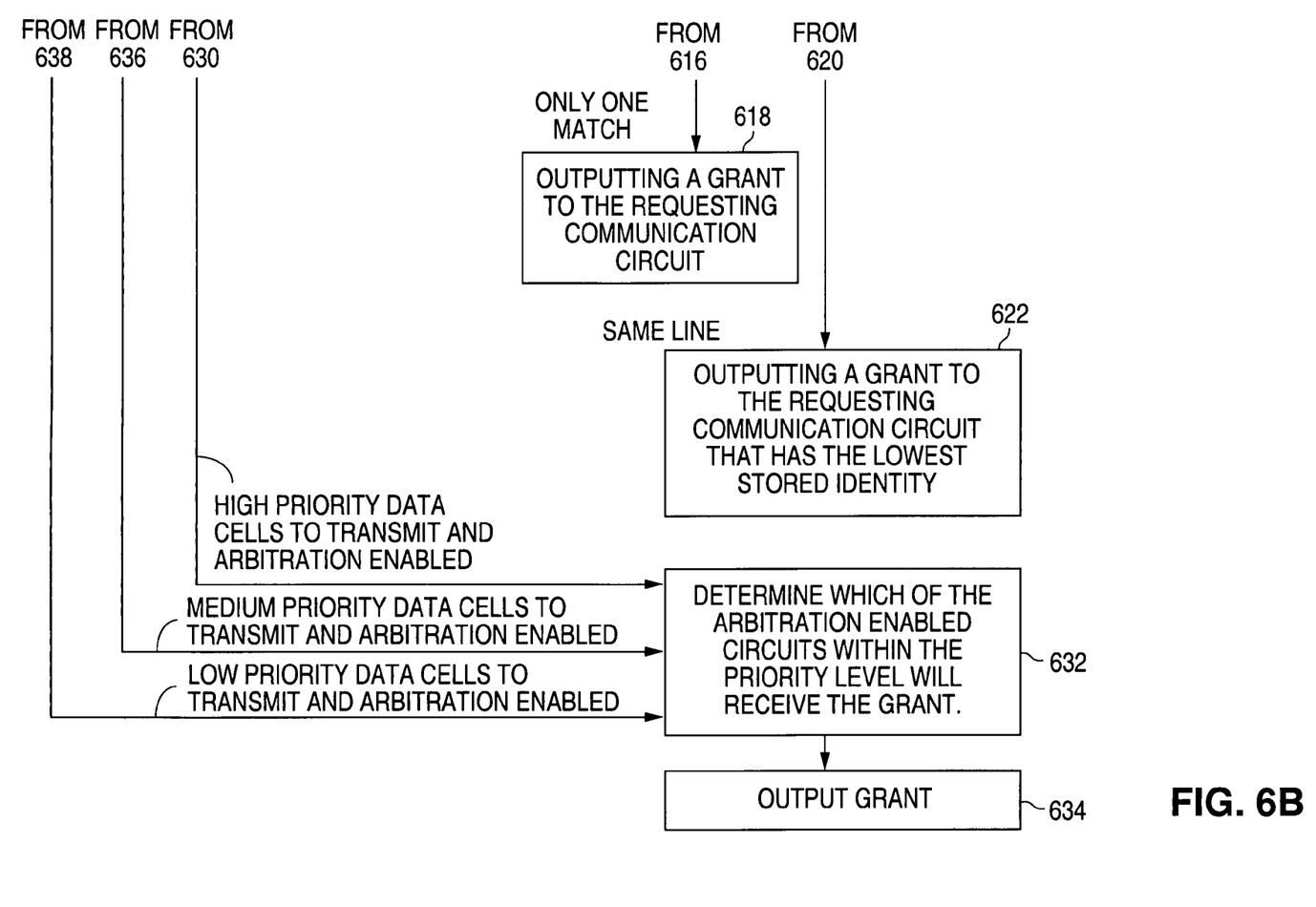

System 500 can operate the same as state machine 200 in determining a group of requesting circuits, as illustrated in states 210, 212, 218, and 220 shown in FIG. 2. FIG. 6 shows a state diagram that illustrates an example of a state machine 600 that grants access to a bus to one of a number of requesting communication circuits in accordance with the present invention. State machine 600 can be used to implement states 214 and 222 shown in FIG. 2.

In the present example, the logic circuit 512 of the bus master has determined the requesting communication circuits that submitted a bus control request to the bus master during the same request period of an arbitration period, such as in states 210, 212, 218, and 220. State machine 600 can be executed by the memory 510 and logic circuit 512 of the communication circuit 116 that is the bus master in system 500.

A shown in FIG. 6, state machine 600 begins at state 610 by determining if the first and second grant information that is associated with the arbitration period, such as the information stored in the rows of the Primary Priority Table and the Backup Priority Table that correspond with the arbitration period, is valid, such as by checking the valid bit in the rows of the Primary Priority Table and the Backup Priority Table. The rows of the Priority Tables are selected to correspond with the same arbitration period. For example, the first row of each table can correspond with the first arbitration period, and the 513$^{th}$ arbitration period when a 512 row Priority Table is used.

When the valid bit indicates that the information is valid, state machine 600 moves to state 612 to determine a first and a second stored identity that are associated with the arbitration period, such as by checking the identity bits in the rows of the Primary Priority Table and Backup Priority Table that correspond with the arbitration period.

In addition, state machine 600 also determines in state 612 whether any requesting communication circuit has an identity that matches the first or the second stored identity. For example, following the first request period, state machine 600 can determine if any of the requesting communication circuits has an identity that matches the stored identity read from the first row of the Primary Priority Table or the first row of the Backup Priority Table.

When a requesting communication circuit has an identity that matches the first or the second stored identity, state machine 600 moves to state 614 to identify the requesting communication circuit as a matching communication circuit, and determine a stored priority that is associated with the arbitration period, such as by checking the priority bits in the row of the Primary Priority Table or the Backup Priority Table that correspond with the matching communication circuit.

In addition, state machine 600 also determines in step 614 whether the priority of the data cell of the matching communication circuit matches the stored priority read from the corresponding row of the Priority Table. For example, if the stored identity held in the first row of the Primary Priority Table does not match the identity of the requesting communication circuit, but the stored identity held in the first row of the Backup Priority Table matches the identity of the requesting communication circuit, state machine 600 determines if the stored priority in the first row of the Backup Priority Table matches the priority of the data cell of the requesting communication circuit.

When the priority of the data cell of the matching communication circuit matches the stored priority, state machine 600 moves to state 616 to determine whether the first stored identity held in the row of the Primary Priority Table and the second stored identity held in the corresponding row of the Backup Priority Table both match a requesting communication circuit.

For example, if the first communication circuit (primary) and the sixth communication circuit (backup) both send bus control requests, step 616 detects this condition. Step 616 also detects when there has been an error in preparing the tables such as when the identity held in a row of the Primary Priority Table and the identity held in the corresponding row of the Backup Priority Table match.

When only one stored identity (of the first stored identity held in the row of the Primary Priority Table and the second stored identity held in the corresponding row of the Backup Priority Table) matches a requesting communication circuit, state machine 600 moves to step 618 to output a grant to the requesting communication circuit. In this example, the grant gives the requesting communication circuit 116 permission to transmit during the next transmission period on a bus.

Thus, the present invention allows the identities of the requesting communication circuits to be compared against both the first stored identity in the Primary Priority Table and the second stored identity in the Backup Priority Table. This, in turn, provides a seamless transition between circuits when a failure has occurred.

For example, when the first communication card (primary) is functioning, the first communication card has an identity that matches the stored identity of one or more rows of the Primary Priority Table. However, when the first communication card fails, the sixth communication card (backup) begins functioning and assumes the responsibilities of the first communication card.

The identity of the sixth communication card does not match any stored identities in the Primary Priority Table, but matches a stored identity in a corresponding row in the Backup Priority Table. Since state machine 600 responds to matches from either table, the Backup Priority Table allows state machine 600 to seamlessly transition from the failure of the first communication circuit to the introduction of the backup sixth communication circuit.

Referring again to step 616, when the stored identity held in the row of the Primary Priority Table and the stored identity held in the corresponding row of the Backup Priority Table both match a requesting communication circuit, the matching condition indicates an error condition and state machine 600 moves to step 620.

In step 620, state machine 600 determines whether the bus control request with an identity that matched the stored identity held in the row of the Primary Priority Table and the bus control request with an identity that matched the stored identity held in the row of the backup priority table came in on the same control lines, e.g., control lines SEL-A0/SEL-A1 or control lines SEL-B0/SEL-B1. For example, when two requests come in, such as for the first (primary) and the sixth (backup) communication circuits, state machine 600 determines whether both requests came in on the same control line.

If both requests came in on the same control lines, state machine 600 moves to step 622 to send a grant to the communication circuit of the two circuits that has the lowest stored identity. On the other hand, if both requests came in on different control lines (which indicates that control lines SEL-A0/SEL-A1 and SEL-B0/SEL-B1 are functioning), state machine 600 moves to step 624 to send a grant to the communication circuit that sent in a request on control lines SEL-A0 and SEL-A1. Steps 620–624 insure that state machine 600 does not stop when an error condition is present.

In state 610 when the grant information is invalid, in state 612 when a requesting communication circuit does not have an identity that matches the first or the second stored identity, and in state 614 when the matching communication circuit does not have a priority that matches the stored priority, state machine 600 moves to state 630 to determine whether any of the requesting communication circuits 116 wishes to transmit a high priority data cell. In addition, state machine 600 also determines in state 630 which of the high priority communications circuits are also arbitration enabled, such as by checking the high priority registers 514 on the communication circuits 116.

When an arbitration-enabled requesting communication circuit has a high priority data cell, state machine 600 moves to state 632 to determine which of the arbitration enabled communication circuits within the priority level will receive the grant (permission to transmit during the next transmission period).

When several requesting communication circuits 116 have the same priority level, the requesting communication circuit 116 to receive the grant can be defined by an arbitration, such as a declining round robin. As noted above, in a declining round robin, the requesting communication circuits 116 circulate within a hierarchical ranking.

After state machine 600 has selected a communication circuit from the arbitration, state machine 600 moves to state 634 to send a grant to the selected communication circuit. The grant gives the selected communication circuit 116 permission to transmit during the next transmission period on a bus.

If no communication circuits with a high priority data cell requested control, state machine 600 moves to state 636 to identify the requesting communication circuits 116 that wish to transmit a medium priority data cell. In addition, state machine 600 also determines in state 636 which of the medium priority communications circuits are also arbitration enabled, such as by checking the medium priority registers 516 on the communication circuits 116.

When an arbitration-enabled requesting communication circuit has a medium priority data cell, state machine 600 moves to state 632 to determine which of the communication circuits within the priority level will receive the grant (permission to transmit during the next transmission period). As above, the requesting communication circuit 116 to receive the grant can be defined by an arbitration, such as a declining round robin.

If no communication circuits with a medium priority data cell requested control, state machine 600 moves to state 638 to identify the requesting communication circuits that wish to transmit a low priority data cell. In addition, state machine 600 also determines in state 638 which of the low priority communications circuits are also arbitration enabled, such as by checking the low priority registers 518 on the communication circuits 116.

When an arbitration-enabled requesting communication circuit has a low priority data cell, state machine 600 moves to state 632 to determine which of the communication circuits within the priority level will receive the grant (permission to transmit during the next transmission period). As above, the requesting communication circuit 116 to receive the grant can be defined by an arbitration, such as a declining round robin. (State machine 600 can alternately be implemented in software.)

One of the advantages of the present invention is that the present invention insures that when a primary communication circuit fails and a backup communication circuit assumes responsibility for the functions of the primary communication circuit, the failure is transparent.

State machine 600 seamlessly transitions from the Primary Priority Table to the Backup Priority Table because state machine 600 looks for a match in either the Primary Priority Table or the Backup Priority Table. As a result, state machine 600 does not care which communication circuit requests control of the bus, or if the primary communication circuit has failed.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. A method of granting access to a bus to one of a plurality of requesting communication circuits that each submitted a bus control request during a request period of an arbitration period, the method comprising:

determining a first and a second stored identity associated with the arbitration period, the first stored identity identifies a first communication circuit, the second stored identity identifies a second communication circuit; and determining whether any requesting communication circuit has an identity that matches the first or the second stored identity.

2. The method of claim 1, further comprising:

identifying a matching communication circuit when a requesting communication circuit has an identity that matches the first or the second stored identity, reading a stored priority associated with the matching communication circuit, the stored priority indicating a priority level of a data cell of the matching communication circuit; and determining whether a priority of the matching communication circuit matches the stored priority.

3. The method of claim 2, further comprising when the priority of the matching communication circuit matches the stored priority, determining if the first and second stored identities both match the identity of the matching communication circuit.

4. The method of claim 3 wherein when the identity of the matching communication circuit matches only the first or the second stored identity, outputting a grant to the matching communication circuit.

5. The method of claim 4
wherein the bus has a plurality of first control lines and a plurality of second control lines; and
further comprising when the first stored identity and the second stored identity both match the identity of the matching communication circuit, determining whether a bus control request with an identity that matched the first stored identity and a bus control request with an identity that matched the second stored identity came in on a same control line.

6. The method of claim 5, and further comprising when the bus control requests came in on the same line, outputting a grant to the requesting communication circuit that has a lowest stored identity.

7. The method of claim 5, further comprising when the bus control requests did not come in on the same control line, outputting a grant to the requesting communication circuit that sent a request in on the first control lines.

8. The method of claim 2, further comprising when a requesting communication circuit does not have an identity that matches the first or the second stored identity, determining a selected communication circuit from the plurality of requesting communication circuits.

9. The method of claim 8 wherein the selected communication circuit is determined with a round robin.

10. The method of claim 2 wherein the priority of the requesting communication circuit is the priority of a data cell to be transmitted onto the bus by the requesting communication circuit.

11. A communications circuit comprising:
a transmit circuit to transmit information onto a cell bus;
a receive circuit to receive information from the cell bus;
a memory to store grant information regarding a plurality of arbitration periods, the grant information for each arbitration period including a first stored identity that identifies a first communication circuit, and a second stored identity that identifies a second communication circuit; and
a logic circuit connected to the transmit circuit, the receive circuit, and the memory to determine whether any communication circuits requested control of a bus during an arbitration period, the logic circuit to determine a first and a second stored identity associated with the arbitration period, and whether any requesting communication circuit has an identity that matches the first or the second stored identity.

12. The communications circuit of claim 11 wherein when a requesting communication circuit has an identity that matches the first or the second stored identity, the logic circuit identifies the requesting communication circuit as a matching communication circuit, reads a stored priority associated with the matching communication circuit, and determines whether a priority of the matching communication circuit matches the stored priority, the stored priority indicating a priority level of a data cell of the communication circuit.

13. The communications circuit of claim 12 wherein when the priority of the matching communication circuit matches the stored priority, the logic circuit determines if the first and second stored identities both match the identity of the matching communication circuit.

14. The communications circuit of claim 13 wherein when the identity of the matching communication circuit matches only the first or the second stored identity, the logic circuit outputs a grant to the matching communication circuit.

15. The communications circuit of claim 14
wherein the bus has a plurality of first control lines and a plurality of second control lines; and
further comprising the step of when the first stored identity and the second stored identity both match the identity of the matching communication circuit, the logic circuit determines whether a bus control request with an identity that matched the first stored identity and a bus control request with an identity that matched the second stored identity came in on a same control line.

16. The communications circuit of claim 15 wherein when the bus control requests came in on the same line, the logic circuit outputs a grant to the requesting communication circuit that has a lowest stored identity.

17. The communications circuit of claim 15 wherein when the bus control requests did not come in on the same control line, the logic circuit outputs a grant to the requesting communication circuit that sent a request in on the first control lines.

18. The communications circuit of claim 12 wherein when a requesting communication circuit does not have an identity that matches the first or the second stored identity, the logic circuit determines a selected communication circuit from the plurality of requesting communication circuits.

* * * * *

UNITED STATES PATENT AND TRADEMARK OFFICE
CERTIFICATE OF CORRECTION

PATENT NO. : 7,003,609 B2  Page 1 of 1
APPLICATION NO. : 10/669193
DATED : February 21, 2006
INVENTOR(S) : Ripy et al.

It is certified that error appears in the above-identified patent and that said Letters Patent is hereby corrected as shown below:

Column 6,
Line 48, delete "Priory" and replace with -- Priority --.

Column 11,
Line 22, delete "and".

Signed and Sealed this

Twentieth Day of June, 2006

JON W. DUDAS
*Director of the United States Patent and Trademark Office*